United States Patent
Yin et al.

(10) Patent No.: US 11,361,120 B2
(45) Date of Patent: Jun. 14, 2022

(54) METHOD AND SYSTEM FOR PROCESSING BUILDING INFORMATION MODELING DATA

(71) Applicant: RUENTEX ENGINEERING & CONSTRUCTION CO., LTD., Taipei (TW)

(72) Inventors: Samuel Yin, Taipei (TW); Wu-Sung Chen, Taipei (TW); Jui-Chen Wang, Taipei (TW); Ming-Huang Lin, Taipei (TW); Wen-Kuei Chang, Taipei (TW)

(73) Assignee: RUENTEX ENGINEERING & CONSTRUCTION CO., LTD., Taipei (TW)

( * ) Notice: Subject to any disclaimer, the term of this patent is extended or adjusted under 35 U.S.C. 154(b) by 310 days.

(21) Appl. No.: 16/597,042

(22) Filed: Oct. 9, 2019

(65) Prior Publication Data
US 2021/0064710 A1 Mar. 4, 2021

(30) Foreign Application Priority Data
Aug. 30, 2019 (TW) .................................. 108131234

(51) Int. Cl.
*G06F 30/13* (2020.01)
*G06F 30/20* (2020.01)

(52) U.S. Cl.
CPC .............. *G06F 30/13* (2020.01); *G06F 30/20* (2020.01); *H02J 2203/20* (2020.01)

(58) Field of Classification Search
CPC .......... G01S 17/88; G06F 30/13; G06F 30/20; G05B 23/0208; G06T 7/30; H02J 2203/20
See application file for complete search history.

(56) References Cited

U.S. PATENT DOCUMENTS

| 6,780,368 B2 * | 8/2004 | Liu ........................ B33Y 10/00 264/401 |
| 7,561,165 B2 * | 7/2009 | Strassenburg-Kleciak .................. G06T 7/593 345/582 |
| 7,643,669 B2 * | 1/2010 | Strassenburg-Kleciak .................. G01S 17/88 382/154 |

(Continued)

FOREIGN PATENT DOCUMENTS

| CN | 102165132 A | 8/2011 |
| CN | 109636677 A | 4/2019 |

(Continued)

OTHER PUBLICATIONS

Taiwan First Office Action dated Jan. 21, 2021, in counterpart Taiwan patent application 108131234, 8 pages in Chinese.

*Primary Examiner* — Thai Q Phan
(74) *Attorney, Agent, or Firm* — Juan Carlos A. Marquez; Marquez IP Law Office PLLC (57) ABSTRACT

The present invention relates to a method for processing building information modeling data including the following steps: inputting a building information model's data that includes two types of multiple objects; identifying the objects to generate results of identification; dividing the objects into a first category and a second category in accordance with the results of identification; removing the objects of the second category; readjusting the first category of objects in accordance with a predetermined rule of a building energy simulation software; and defining attributes of the objects of the first category.

16 Claims, 10 Drawing Sheets

(56) References Cited

U.S. PATENT DOCUMENTS

| | | | |
|---|---|---|---|
| 7,689,032 B2* | 3/2010 | Strassenburg-Kleciak | ............... G01C 15/00 382/154 |
| 2002/0145213 A1* | 10/2002 | Liu | ............... B33Y 50/02 264/40.1 |
| 2006/0110026 A1* | 5/2006 | Strassenburg-Kleciak | ............... G06T 17/10 382/154 |
| 2006/0152522 A1* | 7/2006 | Strassenburg-Kleciak | ............... G06T 15/04 345/582 |
| 2006/0188143 A1* | 8/2006 | Strassenburg-Kleciak | ............... G06T 7/30 382/154 |
| 2006/0195303 A1* | 8/2006 | Thompson | ............... G06F 30/00 703/1 |
| 2018/0231967 A1* | 8/2018 | Cohen | ............... G05B 23/0208 |
| 2019/0155268 A1* | 5/2019 | Cohen | ............... G05B 23/0208 |

FOREIGN PATENT DOCUMENTS

| CN | 109840684 A | 6/2019 |
|---|---|---|
| TW | 201822129 A | 6/2018 |

\* cited by examiner

METHOD AND SYSTEM FOR PROCESSING BUILDING INFORMATION MODELING DATA

TECHNICAL FIELD

The present disclosure generally relates to a method and system for processing information, and more particularly to a method and system for processing building information modeling data.

BACKGROUND

Due to the decline of natural resources on Earth, saving energy and reducing $CO_2$ emissions has become a major issue in modern society. A push towards designing greener buildings is essential for humanity, as average buildings may consume considerable energy via complex machinery used in water, electrical, and air conditioning systems. In order to save energy and reduce $CO_2$ emissions, thoroughly evaluating energy consumption—as well as efficiently arranging the facilities in each part of a building—becomes an important challenge for architects and builders.

In recent years, to effectively measure the energy consumption of a building for use in energy-efficient design strategies, software using building information models (BIMs) has been widely adopted. Specifically, the process of making a building information model mainly includes: collecting data, inputting the building's geometry and setting and simulation parameters, and performing simulation analysis, etc. However, the format of a general three-dimensional building information model is not compatible with the format of a building energy consumption simulation software. Conventionally, all two-dimensional data of a building—such as building facilities and structural specifications—need to be manually inputted into a building information model software, and building material attributes of objects are defined manually, respectively. However, mistakes frequently occur with manual inputting. Furthermore, since the parameters of a building information model are wide-ranging and complex, it requires a well-trained or experienced professional to operate the system. However, to save time, companies tend to oversimplify the model, making it inconsistent with the actual building. Therefore, the results of an analysis may be considerably imprecise.

Accordingly, it is greatly desired to provide a method and a system for processing building information modeling data that can be used to correctly and efficiently set up a building information model.

SUMMARY OF INVENTION

To this end, the present disclosure provides a method and a system for processing building information modeling data, which can convert and adjust three-dimensional building information modeling data for construction and upload them into a building information model software such that the data can be correctly and efficiently calculated.

According to one aspect of the present disclosure, a method for processing building information modeling data includes the following steps: (1) inputting a building information model's data that includes two types of multiple objects; (2) identifying the objects to generate results of identification; (3) dividing the objects into a first category and a second category in accordance with the results of identification; (4) removing the second category of the objects; (5) readjusting the first category of objects in accordance with a predetermined rule of a building energy simulation software; and (6) defining attributes of the first category of the objects.

According to another aspect of the present disclosure, a system for processing the building information modeling data includes: a non-transitory computer-readable storage medium comprising computer-readable instructions and one or more processors configured to receive the computer-readable instructions to perform: (1) inputting a building information model's data including two types of multiple objects; (2) identifying the objects to generate results of identification; (3) dividing the objects into a first category and a second category in accordance with the results of identification; (4) removing the second category of the objects; (5) readjusting the first category of objects in accordance with a predetermined rule of a building energy simulation software; and (6) defining attributes of the first category of the objects.

BRIEF DESCRIPTION OF THE DRAWINGS

The present disclosure as well as a preferred mode of use, further objectives, and advantages thereof will be best understood by referring to the following detailed description of illustrative embodiments in conjunction with the accompanying drawings, wherein.

DETAILED DESCRIPTION

The characteristics, subject matter, advantages, and effects of the present disclosure are detailed hereinafter by reference to embodiments of the present disclosure and the accompanying drawings. It is understood that the drawings referred to in the following description are intended only for purposes of illustration and do not necessarily show the actual proportion and precise arrangement of the embodiments. Therefore, the proportion and arrangement shown in the drawings should not be construed as limiting or restricting the scope of the present disclosure.

The present disclosure provides a method and a system for processing building information modeling (BIM) data which may be a three-dimensional building drawing file used by general contractors. The method for processing building information modeling data may be operated in a system (for example, a computing device using Windows software) including one or more processors (for example, central processing units, CPUs) and a storage medium. The storage medium may be a non-transitory computer-readable storage medium comprising computer-readable instructions. The processor may be configured to receive the computer-readable instructions to carry out the technical elements of the present disclosure in order to achieve advantageous effects.

The present disclosure describes a method for processing building information modeling data used by general contractors to convert and upload the data into a building energy consumption simulation software, which can then use the data to calculate the energy consumption of the building information model.

Figure 1:
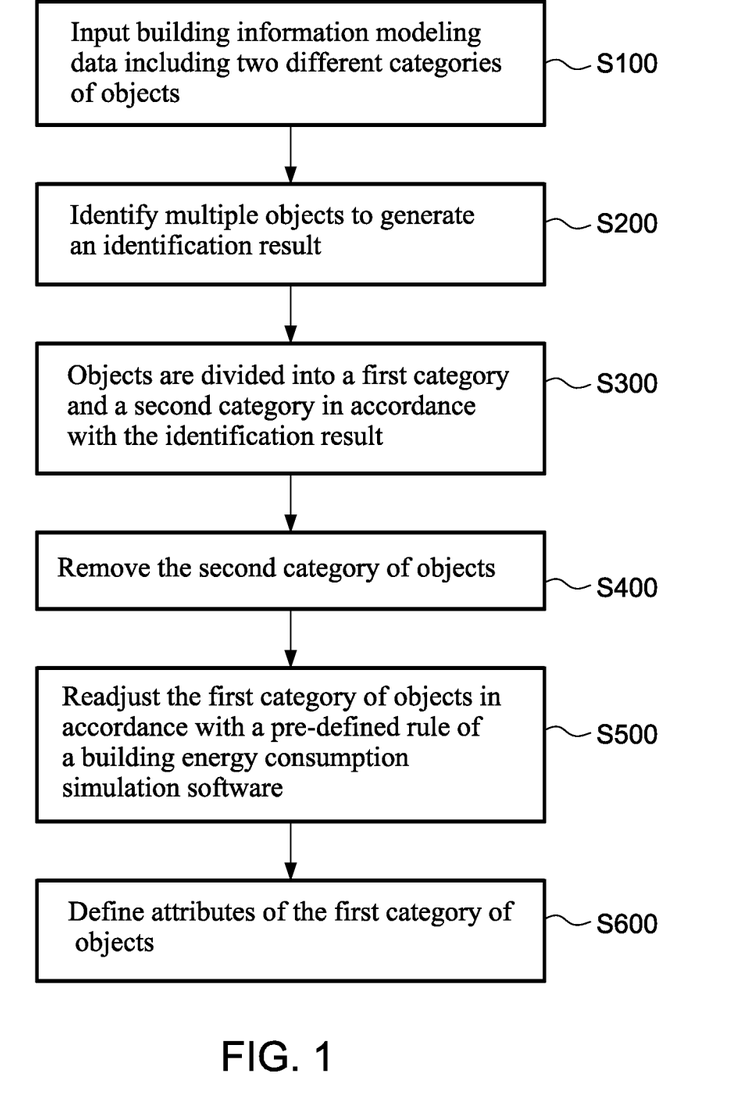
FIG. 1 is a flow chart of a method for processing building information modeling data in accordance with a first embodiment of the present disclosure.
Figure 2:
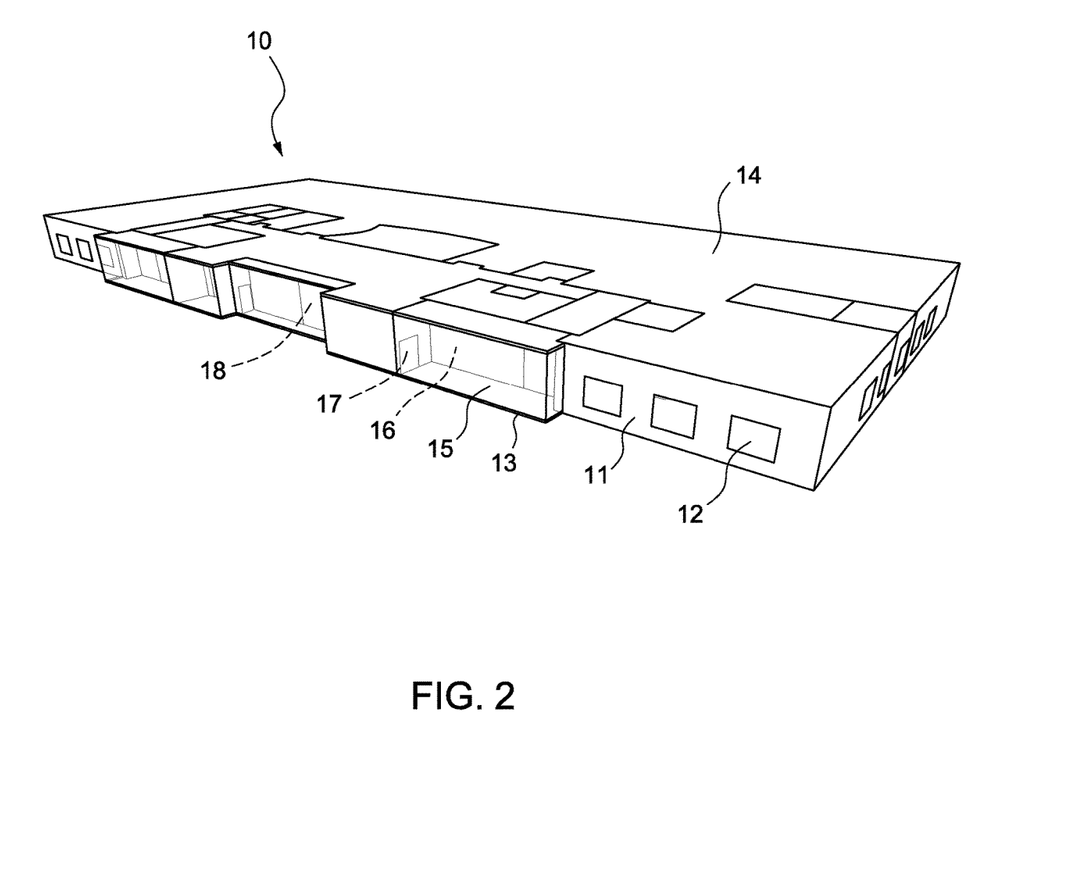
FIG. 2 is a schematic perspective view of a building information model in accordance with one embodiment of the present disclosure.

FIG. 1 is a flow chart of a method for processing building information modeling data in accordance with a first embodiment of the present disclosure, and FIG. 2 is a schematic perspective view of a building information model in accordance with one embodiment of the present disclosure. Referring to FIGS. 1 and 2, the method for processing building information modeling data includes the steps described below. In step S100, building information modeling data are inputted, and the data includes two different categories of objects. In this embodiment, building information modeling data may be a three-dimensional drawing file which depicts a floor 10 of a building. The floor 10 includes different categories of objects, for example, an exterior wall, an exterior window, a top board, a floor plate, an (inner) partition wall, a door, an inner window, a lamp and fixtures, conduits and others. In this embodiment, step S100 further includes inputting (or uploading) the building information modeling data into a first software, for example, a three-dimensional modeling computer program, Autodesk Revit, that can perform the steps shown in FIG. 1.

In step S200, multiple objects are identified to generate identification results. Categories of multiple objects are identified and may be, but are not limited to, an exterior wall 11, an exterior window 12, a bottom board 13, a top board 14, a roof, a (glass) curtain wall 15, a partition wall 16, a conduit wall, a decoration wall, an inner door 17, an inner window 18, conduits and furniture.

In step S300, objects are divided into a first category and a second category in accordance with the identification results. Then, in step S400, the second category of objects is removed (that is, deleted or cancelled). In this embodiment, the first category of objects may at least include at least one of an exterior wall 11, an exterior window 12, a bottom board 13, a top board 14, a curtain wall 15, a partition wall 16 and a roof. The second category of objects may at least include at least one of a conduit shaft wall, a decoration wall, an inner door 17, an inner window 18, a conduit and furniture. Generally, three-dimensional drawing files used for construction include a lot of construction information and depict all details of buildings. However, such comprehensive details (for example, in the second category of objects) do not substantively affect the calculation of energy consumption of the entire building, but may affect the precision or even correctness of the evaluation or estimation calculated by a building energy consumption simulation software. Thus, redundant and unnecessary objects for construction (that is, the second category of objects) can be removed for calculation of energy consumption of a building. Furthermore, the building energy model file for building energy consumption simulation software needs to be compatible with (or conform to) a specific format, and thus in step S400, objects are divided into the first and second categories wherein the second category of objects is later removed. For example, a partition wall 16 is generally installed with an inner window (such as glass) or a door. However, such inner window or door has little impact on heat transfer between two spaces separated by the partition wall 16. Hence, to facilitate and effectively simplify the calculation, the inner window and the door installed on the partition wall 16 are removed from consideration while the partition wall 16 itself is retained. In addition, in some embodiments of the present disclosure, the objects may be divided into the first and second categories in accordance with a built-in lookup list in the software. Furthermore, in other embodiments, the objects may be manually divided into the first and second categories by a user.

In step S500, the first category of objects is readjusted in accordance with a pre-defined rule stored in a building energy consumption simulation software. That being said, in order to make the current building information modeling data compatible with the format adopted by the building energy consumption simulation software, the first category of objects needs to be adjusted. It should be noted that in this embodiment, the step S400 of removing the second category of objects is performed before the step S500 of readjusting the first category of objects is performed. However, in other embodiments, the step S500 may be performed before the step S400 of removing the second category of objects.

Figure 3:
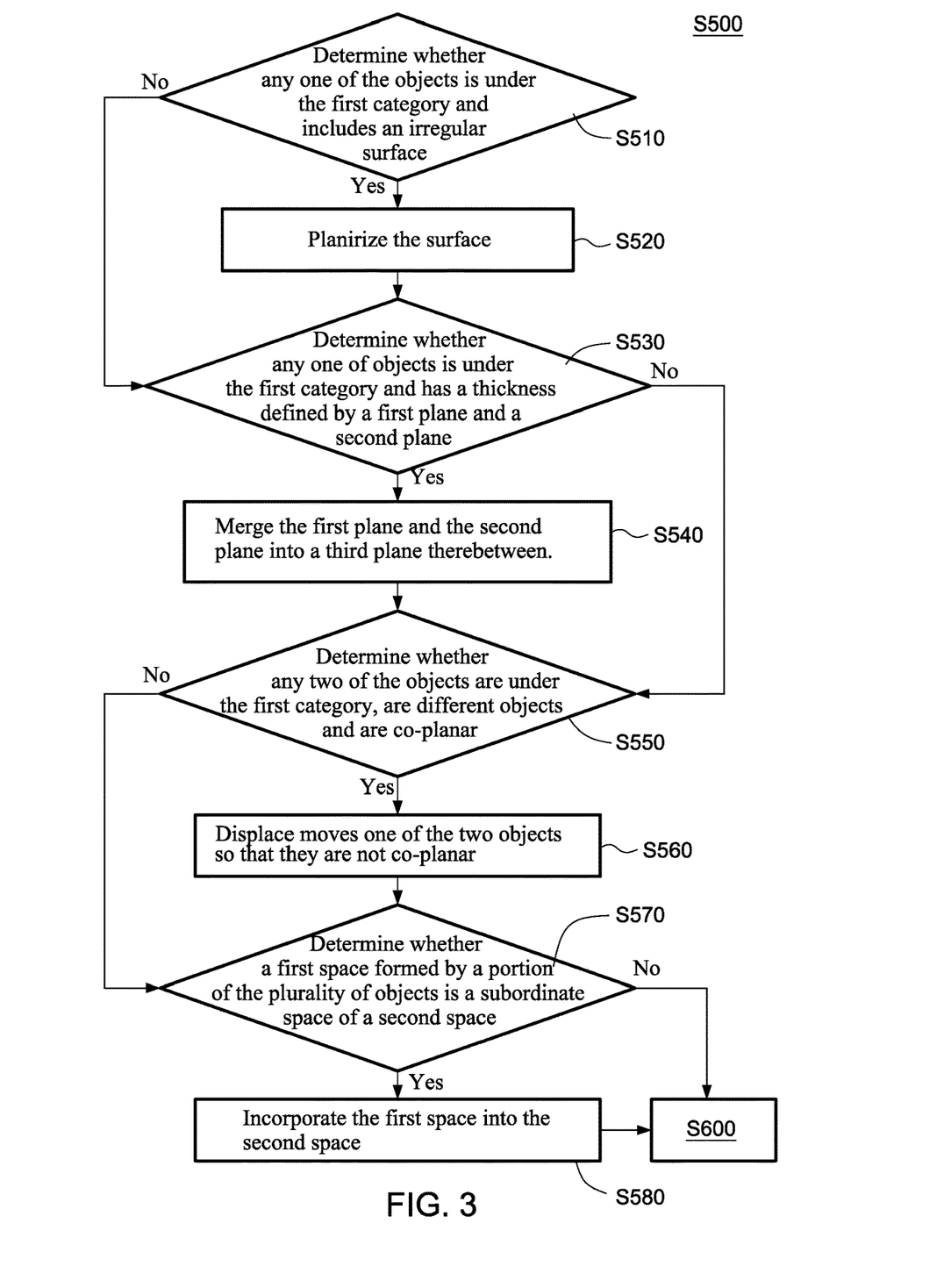
FIG. 3 is a flow chart of a step of readjusting a first category of objects of the method for processing the building information modeling data in accordance with the first embodiment of the present disclosure.
Figure 4A:
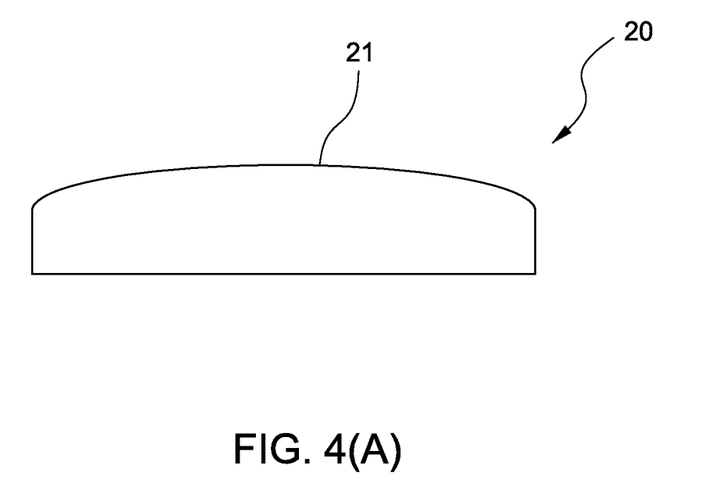
FIGS. 4A and 4B are schematic top views of performing steps S510 and S520 on an object, respectively.
Figure 4B:
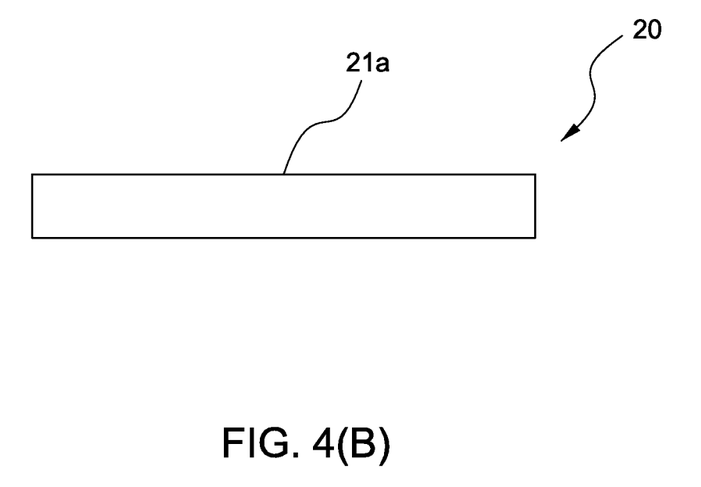

FIG. 3 is a flow chart of a step of readjusting a first category of objects of the method for processing the building information modeling data in accordance with the first embodiment of the present disclosure. Referring to FIG. 3, in this embodiment, step S500 of readjusting the first category of objects further includes the steps described below. In step S510, whether any one of the objects is under the first category—or includes an irregular surface—is determined. When an object is under the first category and has an irregular surface, then step S520 is performed, which planarizes the surface. The term "planarize" or "planarization" refers to an act that shapes a non-planar surface into a planar surface (plane). When an object does not belong to the first category or does not have an irregular surface, or step S520 has been performed, then step S530 is performed. FIGS. 4A and 4B are schematic top views that show performing steps S510 and S520 on an object, respectively. As shown in FIG. 4A, an object 20 is a wall that has a protruding (or convex) surface 21. Because the protruding surface 21 is not a plane (that is, having an irregular shape as defined in this embodiment), then in step S520, the protruding surface 21 is planarized, as shown in FIG. 4B. Therefore, the object 20 is adjusted to simplify an energy consumption calculation without substantially affecting the accuracy of the energy consumption calculation.

Figure 5A:
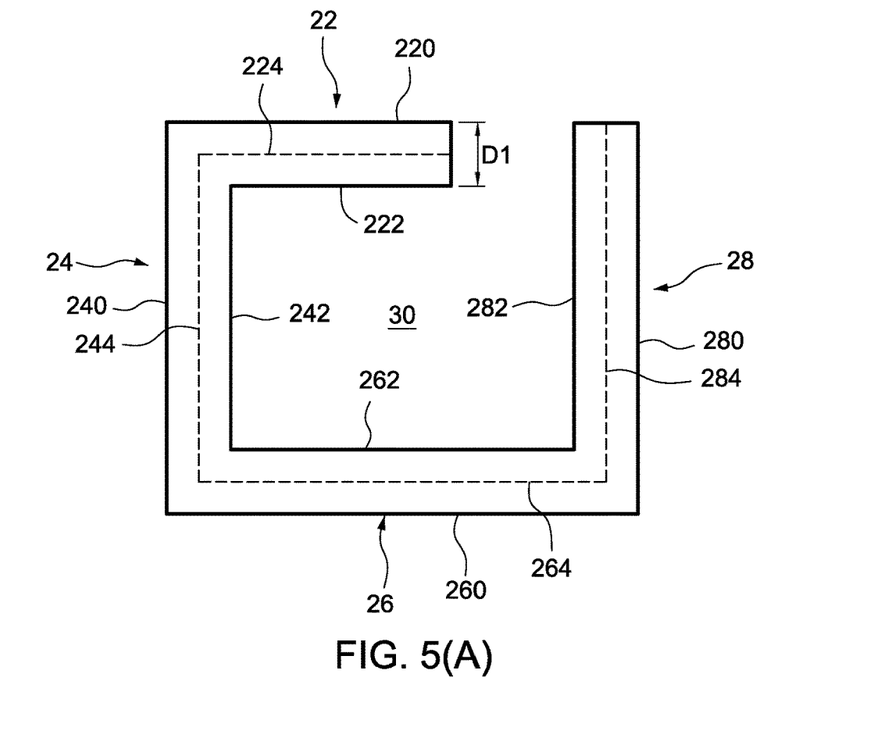
FIGS. 5A and 5B are schematic top views of performing steps S530 and S540 on multiple objects, respectively.
Figure 5B:
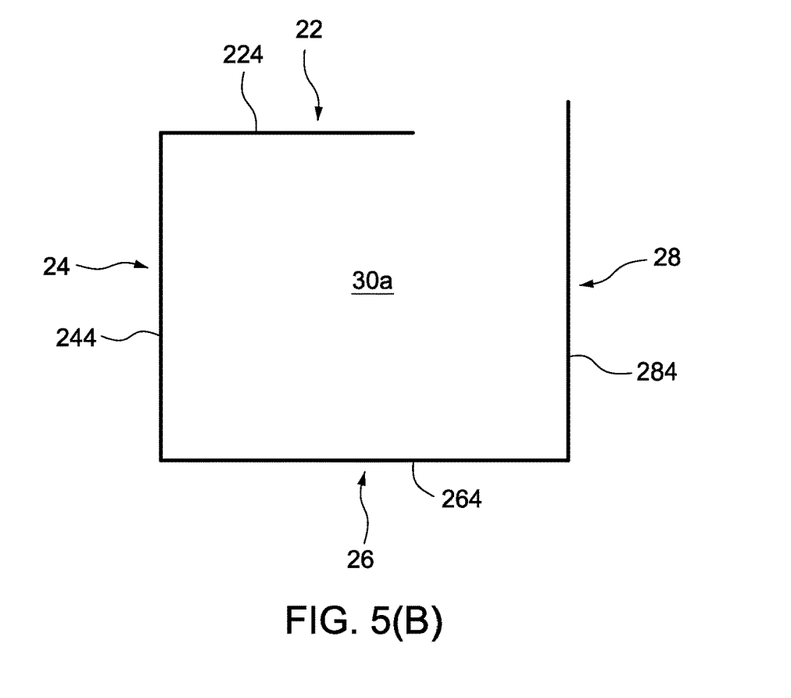

FIG. 3, step S530, illustrates whether it can be determined that any one of the objects is under the first category and has a thickness defined by a first plane and a second plane. When an object is under the first category and has a thickness (for example, the thickness is greater than 0.1 cm), then step S540 is performed, which merges the first plane and the second plane into a third plane (a virtual plane) between them. In one embodiment, the third plane is substantially in the middle of the first plane and the second plane. When an object is not under the first category or does not have a thickness, or step S540 has been performed, then step S550 is performed. FIGS. 5A and 5B are schematic top views that illustrate performing steps S530 and S540 on multiple objects, respectively. In FIG. 5A, objects 22, 24, 26, 28 are walls that encompass and form a space 30, for example, an office space or a bedroom. Objects 22, 24, 26, 28 have exterior wall surfaces 220, 240, 260, 280 and interior wall surfaces 222, 242, 262, 282, respectively. In this embodiment, the exterior wall surfaces 220, 240, 260, 280 and the interior wall surfaces 222, 242, 262, 282 are planes. Take the object 22 for example; when it is determined that the object 22 has a first plane (that is, exterior wall surface 220) and a second plane (that is, interior wall surface 222) and has a thickness D1 defined therebetween, then a virtual third plane 224 is formed (shown in dotted lines in FIG. 5A). Also, the third plane 224 in this embodiment is located in the middle of the exterior wall surface 220 and the interior wall surface 222. Next, in order to facilitate the calculation, the exterior wall surface 220 and the interior wall surface 222 are removed, and the third plane 224 is retained, as shown in FIG. 5B. That is, for performing the calculation, third planes 244, 264, 284 of objects 24, 26, 28 are created (shown in dotted lines of FIG. 5A), and exterior wall surfaces 240, 260, 280 and interior wall surfaces 242, 262, 282 of the objects 24, 26, 28 are removed. Hence, space 30a (shown in solid lines of FIG. 5B) is formed and encompassed by third planes 224, 244, 264, 284 of the objects 22, 24, 26, 28. Although the volume of the space 30a shown in FIG. 5B is slightly different from the space 30 shown in FIG. 5A, such difference does not substantially affect the energy consumption calculation. As shown in FIG. 5A and FIG. 5B, the space 30a formed and encompassed by the third planes 224, 244, 264, 284 of the objects 22, 24, 26, 28 is substantively the same as space 30.

Figure 6A:
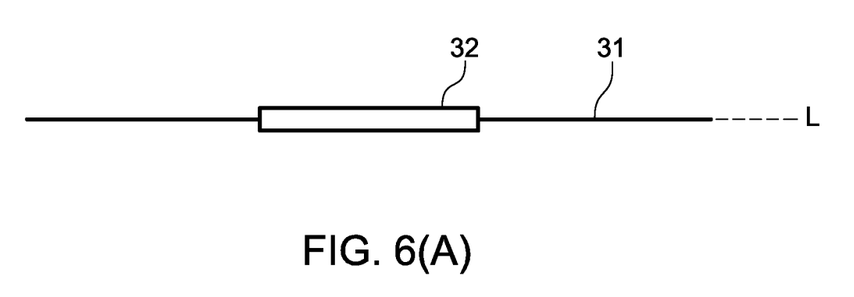
FIGS. 6A and 6B are schematic top views of performing steps S550 and S560 on two objects, respectively.
Figure 6B:
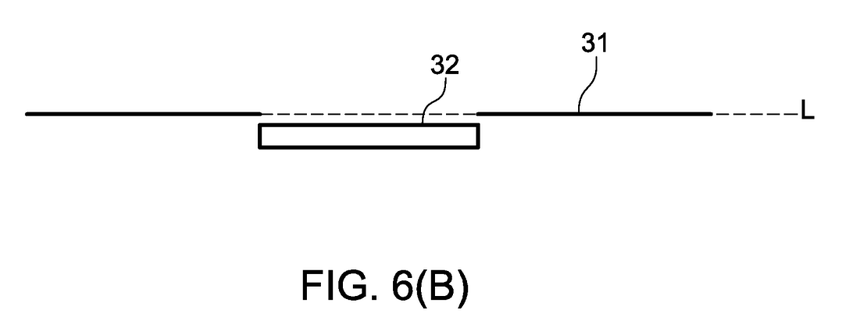

Referring to FIG. 3, in step S550, whether any two of the objects are under the first category, are different objects, and are co-planar is determined. When two objects are under the first category, are different objects and are co-planar, then step S560 is performed that displaces one of the two objects from the other until they are separate. When the two objects are not under the first category or do not have a thickness, or step S560 has been performed, then step S570 is performed. FIGS. 6A and 6B are schematic top views that illustrate performing steps S550 and S560 on two objects, respectively. For example, as shown in FIG. 6A, object 31 is a wall, and object 32 is window. The object 32 is disposed in the object 31, and the objects 31, 32 are co-planar on plane L. When objects with different categories are co-planar, the software may mistakenly identify the two objects as the same, such that the software may wrongfully calculate an energy consumption estimation. Hence, under this circumstance, one of the two objects may be moved away from the other object in order to prevent wrongful calculation. As shown in FIG. 6B, the object 32 (window) is moved with respect to the object 31 (wall) and the plane L such that the two objects 31, 32 are not overlapped. Although the above parallel movement may generate a gap between the two objects 31, 32, such gap does not substantially affect the energy consumption calculation. In this embodiment, the object 31 shown in FIGS. 6A and 6B has a thickness. In other embodiments of the present disclosure, the object 32 (window) may be adjusted in advance to become a plane (that is, not having a thickness) so that the calculation can be comparatively precise.

Figure 7A:
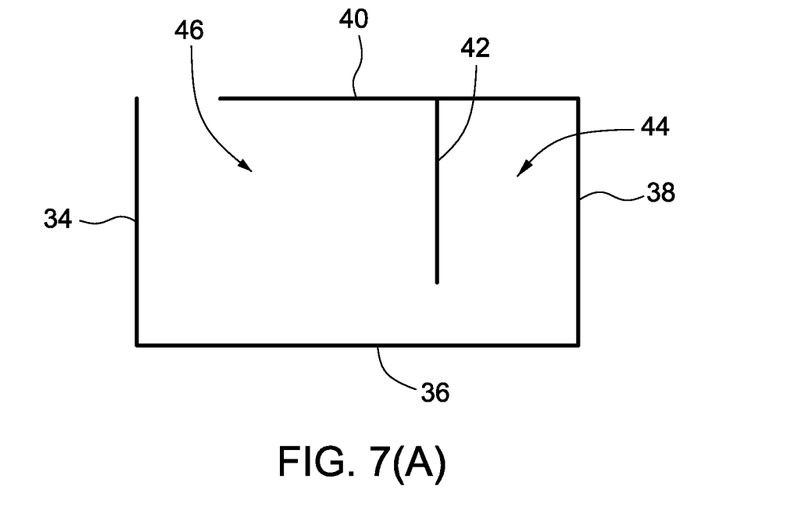
FIGS. 7A and 7B are schematic top views of performing steps S570 and S580 on multiple objects, respectively.
Figure 7B:
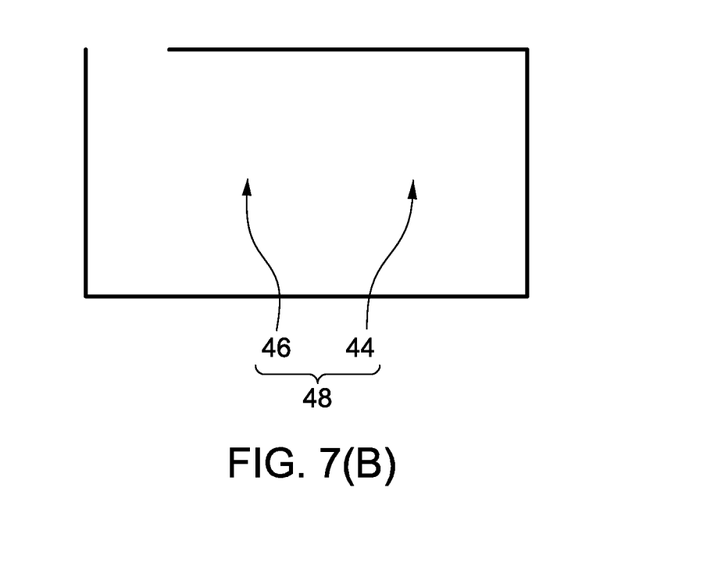

In step S570, it is determined whether the first space formed by at least a portion of the plurality of objects is a subordinate space of a second space. When it is determined that the first space is a subordinate space of the second space, then step S580 is performed, which incorporates the first space into the second space. When the first space is not a subordinate space of the second space (i.e., they are independent from each other), or step 560 has been performed, then step 600 is performed. FIGS. 7A and 7B are schematic top views that show performing steps S570 and S580 on multiple objects, respectively. Referring to FIG. 7A, objects 34, 36, 38, 40, 42 are walls that together form first space 44 and second space 46. In one embodiment, the first space 44 may be a storage room, and the second space 46 may be an office. In another embodiment, the first space 44 may be a walk-in closet, and the second space 46 may be a bedroom. In yet another embodiment, the first space 44 may be a conduit room or a pantry, and the second space 46 may be a kitchen. Generally, a storage room may be considered as a subordinate space of an office, a walk-in closet may be considered as a subordinate space of a bedroom, and a conduit room or a pantry may be considered a subordinate space of a kitchen. Hence, if the two spaces are combined, it does not substantially affect energy consumption calculation and may simplify the calculation. Accordingly, as shown in FIGS. 7A and 7B, to facilitate the calculation, the object 42—which is considered a partition—is removed and the first space 44 is incorporated into the second space 46 so as to form third space 48. In addition, attributes of the first space 44 and the second space 46 can be obtained or identified in accordance with step 200.

Next, in step S600, attributes of the first category of objects are defined. For example, the attributes may be defined by a user or by software. In one embodiment, step S600 further includes: exporting the building information modeling data to a first file in a second software, wherein the data format of the first file is different from that of the building information modeling data. In one embodiment, the second software is a three-dimensional modeling computer program, SketchUp of Trimble Navigation, Ltd. In this particular embodiment, step 600 may be performed in SketchUp. In one embodiment, the data format of the first file is gbXML (Green Building XML), which is exported to SketchUp. The format of gbXML is an industry supported standard format for storing and sharing building properties (attributes) between 3D Architectural and Engineering Analysis Software. Specifically, "room/space volume" of Revit (first software) can be used to export a file into SketchUp (second software). Moreover, the defined attribute in this embodiment is a heat transfer attribute. For example, the heat transfer attribute is light transmittance or heat conductance. A heat transfer attribute of the same category of objects may be separately defined, and in other embodiments, same heat transfer attribute of the same category of objects may be defined together at the same time. In addition, step S600 may also include: defining a building material attribute of objects, respectively. In another embodiment, an object that is perpendicular to a horizontal plane and has a thickness is automatically defined as a wall; another object that is parallel with the horizontal plane is defined as a bottom or top board (top or bottom plate). Hence, these separate defining steps facilitate and simplify the energy consumption estimation/calculation.

Figure 8:
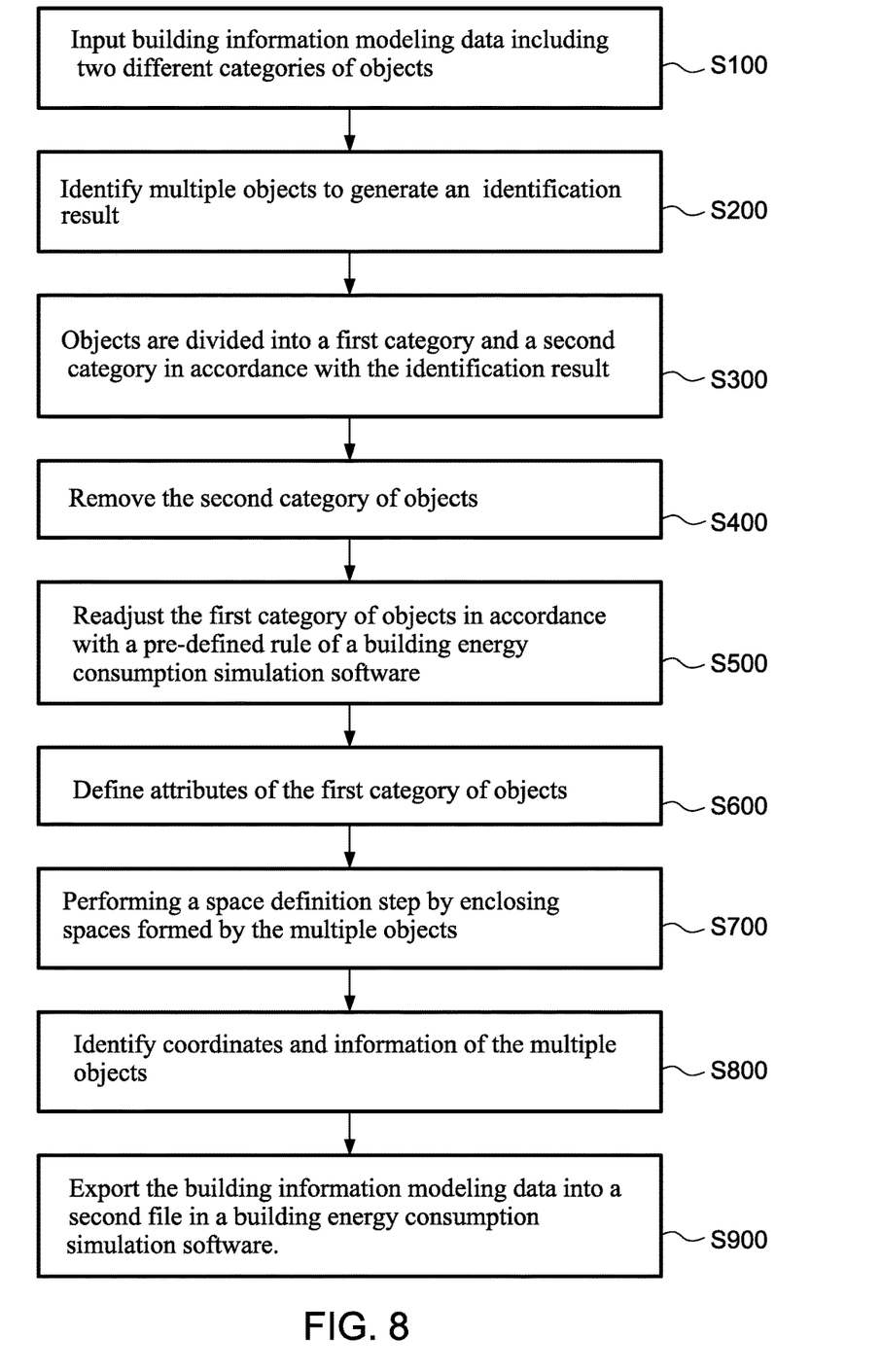
FIG. 8 is a flow chart of a method for processing building information modeling data in accordance with a second embodiment of the present disclosure.
Figure 9:
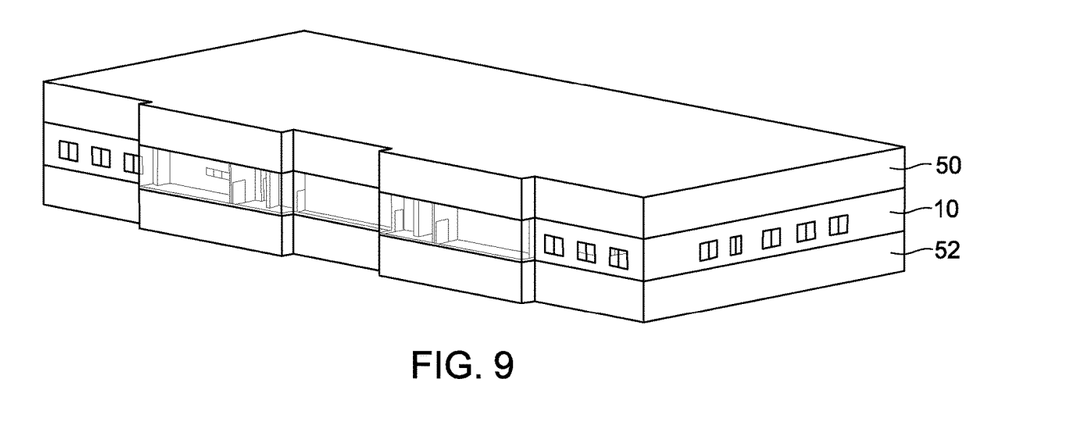
FIG. 9 is a schematic perspective view of performing step S700 on a building information modeling of FIG. 2.
Figure 11:
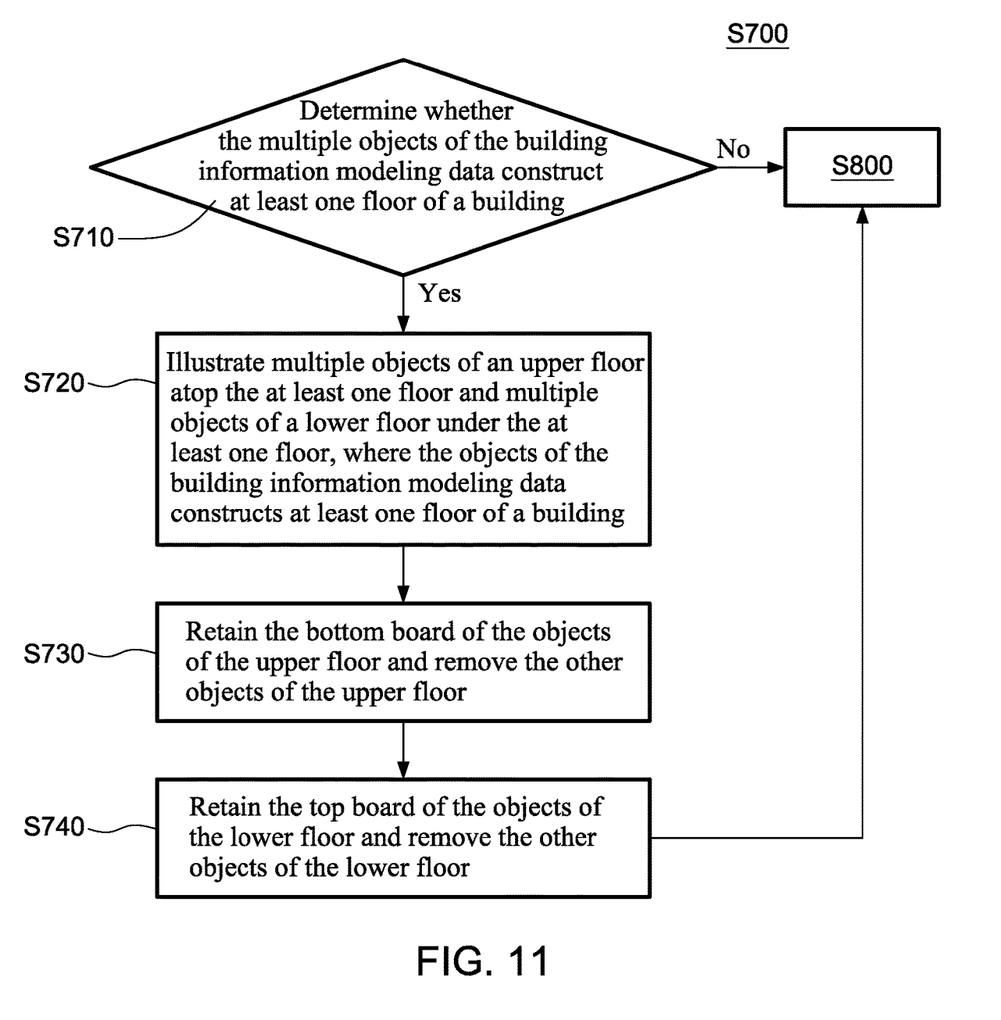
FIG. 11 is a flow chart of a space defining a step of the method for processing building information modeling data in accordance with an embodiment of the present disclosure.

FIG. 8 is a flow chart of a method for processing building information modeling data in accordance with a second embodiment of the present disclosure. Compared with the method for processing building information modeling data shown in FIG. 1, the method for processing building information modeling data in this embodiment further includes:

performing a space definition step S700 that encloses space formed by at least one of the multiple objects. In this embodiment, the space definition step S700 further includes the steps shown in FIG. 11: determining whether the multiple objects of the building information modeling data construct at least one floor of a building (step S710); illustrating multiple objects of an upper floor including a bottom board atop the at least one floor, and multiple objects of a lower floor including a top board under the at least one floor, provided that the multiple objects of the building information modeling data constructs at least one floor of a building (step S720); retaining the bottom board of the objects of the upper floor and removing the other objects of the upper floor (step S730); and retaining the top board of the objects of the lower floor and removing the other objects of the lower floor (step S740); performing step S800 shown in FIG. 8, provided that it is determined that the multiple objects of the building information modeling data do not construct at least one floor of a building, or provided that step S740 has been performed. FIG. 9 is a schematic perspective view that shows performing step S700 on a building information modeling of FIG. 2. As shown in FIG. 9, when the building information modeling data is not a single enclosed space, it may be difficult to calculate the volume of the building, and thus the estimation may not be accurately estimated. To this end, in addition to the floor 10, main objects of upper floor 50 (that is, objects forming the space of the floor 50) and main objects of lower floor 52 (that is, objects forming the space of the floor 52) are created. Then, the objects of the upper floor 50 and the lower floor 52 are removed except that the bottom board of the upper floor 50 and the top board of the lower floor 52 are retained (kept) to assure that the top and the bottom of the floor 10 are enclosed by the bottom board of the upper floor 50 and the top board of the lower floor 52.

Then, step S800 is performed that coordinates and information/data of the multiple objects are identified. In this step, the arranged coordinates and information/data of all objects are identified in the SketchUp program.

Figure 10:
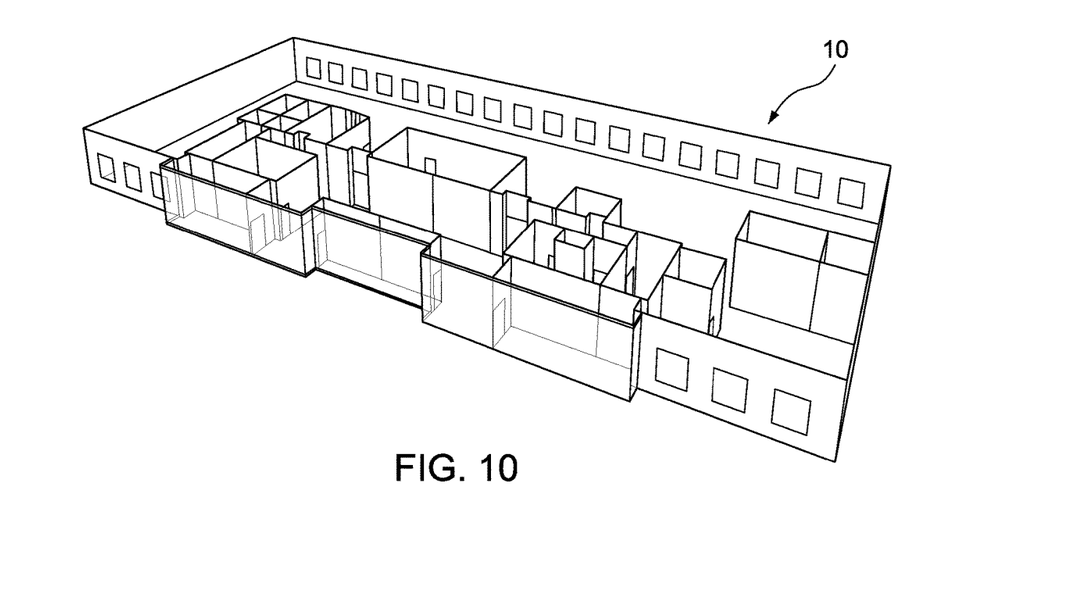
FIG. 10 is a schematic perspective view of a building information modeling of FIG. 2 converted into a building energy consumption simulation software.

Then, step S900 is performed; the building information modeling data is exported into a second file in a building energy consumption simulation software, wherein the data format of the second file is different from that of the first file. FIG. 10 is a schematic perspective view that shows a building information modeling of FIG. 2 is converted into a building energy consumption simulation software. As shown in FIG. 10, after the objects of the floor 10 have been adjusted and identified, the objects are ready to be exported into a building energy consumption simulation software. In this embodiment, the building energy consumption simulation software is Building Energy Simulation Technology with Artificial Intelligence program (BESTAI) designed by Industrial Technology Research Institute (ITRI) in Taiwan. This program guides users to design or adjust building information modeling and provide on-line real-time building simulation analysis in order to obtain optimal energy consumption analysis and to provide users a customized analytical sheet. The analysis also includes Return On Investment (ROI), daily or monthly energy consumption analysis, and electrical bill analysis. Moreover, the file format may be IDF file format. In other embodiments of the present disclosure, other building energy consumption simulation software having functions similar to those of the BESTAI may also be adopted.

To sum up, the present disclosure provides a method and a system for processing building information modeling data that exports building information modeling data into a building energy consumption simulation software. Using the data, the building energy consumption simulation software calculates the energy consumption of the building information model. Generally speaking, file formats of a building information model used by general contractors are not compatible with or do not conform to the file formats of building energy consumption simulation software. The present disclosure therefore provides a method and a system for processing building information modeling data that can effectively use the data to correctly and efficiently set up or build up a building energy model.

The terminology used in the description of the present disclosure is for the purpose of describing particular embodiments only, and is not intended to limit the disclosure. As used in the description of the disclosure and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items.

It shall be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The use of directional adjectives "above, "under," "upper," "lower," "below," "left," "right," "up," "down," "top," "bottom," "vertical," "horizontal," and like terms, are meant to assist with understanding relative relationships among design elements and should not be construed as meaning an absolute direction in space nor regarded as limiting. For example, in some embodiments, "a first component is on a second component" describes the first component being on the second component (the first component is directly on the second component), some other components between the first and second components.

Terms such as "approximately," "substantially," or "about" are applied to describe a small variation of a structural unit of an apparatus. When a term is used in conjunction with another term to describe a particular characteristic of the claimed disclosure, such term can indicate the exact events or circumstances, and similar exact events or circumstances.

Obviously, numerous modifications and variations of the present disclosure are possible in light of the above teachings. It is therefore to be understood that within the scope of the appended claims, the present disclosure may be practiced otherwise than as specifically described herein.

What is claimed:

1. A method for processing building information modeling data comprising the following steps:
    inputting a building information model's data that includes a plurality of objects;
    identifying the plurality of objects to generate results of identification;
    dividing the plurality of objects into a first category and a second category in accordance with the results of identification;
    removing the second category of objects;
    readjusting the first category of objects in accordance with a predetermined rule of a building energy simulation software; and
    defining attributes of the first category of objects,
    wherein the step of readjusting the first category of objects further comprises:

determining whether an object of the plurality of objects is under the first category, and whether the one of the plurality of objects has a thickness defined by a first plane and a second plane; and
merging the first plane and the second plane into a third plane therebetween where the object is under the first category and has the thickness.

2. The method of claim 1, wherein the step of inputting the building information model's data comprises:
loading the building information modeling data into a first software.

3. The method of claim 2, wherein the step of defining attributes of the objects of the first category further comprises:
exporting the building information modeling data to a first file in a second software, the data format of the first file being different from that of the building information modeling data.

4. The method of claim 3, wherein
the first software is a 3D modeling computer program, Autodesk Revit; and
the second software is a 3D modeling computer program, SketchUp.

5. The method of claim 3, further comprising:
exporting the building information modeling data to a second file, the data format of the second file being different from that of the first file.

6. The method of claim 1, wherein the step of readjusting the first category of objects further comprises:
determining whether an object of the plurality of objects is under the first category and whether the object has an irregular surface; and
planarizing the object where the object is under the first category and has the irregular surface.

7. The method of claim 1, wherein the third plane is in the middle of the first plane and the second plane.

8. The method of claim 1, wherein the step of readjusting the first category of objects further comprises:
determining whether a first space formed by a portion of the plurality of objects is a subordinate space of a second space; and
incorporating the first space into the second space when the first space is the subordinate space of the second space.

9. The method of claim 1, further comprising:
defining a building material attribute of each of the plurality of objects.

10. The method of claim 1, further comprising:
performing a space definition step by enclosing spaces formed by the plurality of objects.

11. The method of claim 10, wherein the space definition step further comprises:
determining whether the plurality of the objects of the building information modeling data constructs at least one floor of a building;
illustrating a plurality of objects of an upper floor of the at least one floor and a plurality of objects of a lower floor of the at least one floor, where the plurality of objects of the building information modeling data constructs at least one floor of a building;
retaining only a bottom board of the objects of the upper floor and removing the other objects of the upper floor; and
retaining a top board of the objects of the lower floor and removing the other objects of the lower floor.

12. The method of claim 1, further comprising:
identifying the coordinates and information of the plurality of objects.

13. The method of claim 1, wherein
the first category of objects comprises at least one of an exterior wall, an exterior window, a bottom board, a top board, a roof and a curtain wall; and
the second category of objects comprises at least one of a partition wall, a conduit wall, an inner door, an inner window, a conduit and a furniture.

14. The method of claim 1, wherein one of the attributes is a heat transfer attribute.

15. A method for processing building information modeling data comprising the following steps:
inputting a building information model's data that includes a plurality of objects;
identifying the plurality of objects to generate results of identification;
dividing the plurality of objects into a first category and a second category in accordance with the results of identification;
removing the second category of objects;
readjusting the first category of objects in accordance with a predetermined rule of a building energy simulation software; and
defining attributes of the first category of objects,
wherein the step of readjusting the first category of objects further comprises:
determining whether two nearby objects of the plurality of objects are under the first category, are different objects, and are co-planar; and
displacing one of the two objects away from the other of the two objects so that they are not co-planar, where the two objects are under the first category, are two different objects and are co-planar.

16. A system for processing the building information modeling data, comprising:
a non-transitory computer-readable storage medium comprising computer-readable instructions and one or more processors configured to receive the computer-readable instructions to perform:
inputting a building information model's data that includes a plurality of objects;
identifying the plurality of objects to generate results of identification;
dividing the plurality of objects into a first category and a second category in accordance with the results of identification;
removing the objects of the second category;
readjusting the first category of objects in accordance with a predetermined rule of a building energy simulation software; and
defining attributes of the objects of the first category,
wherein the step of readjusting the first category of objects further comprises:
determining whether an object of the plurality of objects is under the first category, and whether the one of the plurality of objects has a thickness defined by a first plane and a second plane; and
merging the first plane and the second plane into a third plane therebetween where the object is under the first category and has the thickness.

* * * * *